Patented Nov. 26, 1935

2,022,256

UNITED STATES PATENT OFFICE 2,022,256

PROCESS FOR REFINING OF ALKYL PHENOLS

Reuben Schuler, Elizabeth, N. J., assignor to Stanco Incorporated

No Drawing. Application December 1, 1933, Serial No. 700,609

4 Claims. (Cl. 260—154)

This invention relates to an improved process for refining alkyl phenols and more particularly to the use of liquid ammonia for the separation of purified alkyl phenols from crude products containing the same in admixture with various impurities or products of side reactions. This process is particularly suitable for separating alkyl phenols from admixture with alkyl phenyl ethers in which the alkyl groups contain 4 or more carbon atoms, for example, 6, 8, 10 or more carbon atoms. Alkyl phenyl ethers containing less than 4 carbon atoms in alkyl groups are usually soluble in liquid ammonia.

In many preparations of alkyl phenols the crude product consists largely of a mixture of alkyl phenols and corresponding alkyl phenyl ethers. This is the case, for example, when the alkyl phenol is produced by reaction of a phenol with a secondary or tertiary alcohol or olefine under suitable reaction conditions such as at elevated temperatures and pressures and/or in the presence of catalysts and assisting reagents such as concentrated sulphuric acid. The separation is ordinarily conducted by neutralizing the phenols with caustic soda or other suitable alkali to produce water soluble products which are extracted with water, reacidified and distilled. Such processes involve substantial expense due to loss of chemicals and also some loss of the product caused by condensation, polymerization and incomplete extraction.

It has now been found that the alkyl phenols can be separated readily and substantially completely from these crude products by means of liquid ammonia. The alkyl phenols are readily dissolved in liquid ammonia. The alkyl phenyl ethers especially when containing alkyl groups of 4 or more carbon atoms are dissolved to a slight extent or not at all. Hexyl phenyl ether, for example, has been found to be entirely insoluble in liquid ammonia. Means for conducting this extraction will be readily apparent to skilled chemists. The product may be agitated with liquid ammonia at atmospheric or elevated pressure and on being allowed to stand, the mixture separates into an ammonia layer containing alkyl phenols and a layer of undissolved impurities such as alkyl phenyl ethers, hydrocarbons, etc. The ammonia layer is separately removed and the alkyl phenols separated therefrom by suitable means such as by evaporation of the ammonia, which may be recondensed and reused. The extraction may be conducted in a batch or continuous operation and in a single step or series of steps. Countercurrent extraction methods are preferred where feasible.

One method of refining alkyl phenols, according to the herein described invention is illustrated in the following example.

1120 c. c. of hexene and 1000 c. c. of commercial cresol are mixed and then 670 c. c. of 95% sulphuric acid is slowly added while the mixture is stirred and cooled to prevent a rise in temperature above about 70° C. The stirring is continued for about 8 hours and then 3 liters of water are added, and the mixture is allowed to stand. A lower aqueous acid layer is thereby formed and is separately withdrawn. 1½ liters of water are then added to the upper layer, which is then heated under reflux with slow distillation to remove unreacted hexene. The mixture is then allowed to settle and the lower aqueous layer is drawn off. The upper layer is washed with one or more volumes of water to remove unreacted cresol and is then mixed with an equal volume of liquid ammonia at atmospheric pressure. The mixture is allowed to stand, the resulting ammonia layer is drawn off and the ammonia removed therefrom by evaporation. There is thus obtained a residue consisting substantially of pure secondary hexyl cresols. The undissolved residue of the ammonia extraction consists largely of secondary hexyl cresyl ethers.

The preparation of alkyl phenols shown in the above example is described more fully in the copending application Serial No. 522,177 filed March 12, 1931 by H. E. Buc. Alkyl phenols may be similarly produced by reacting cracked petroleum fractions or the olefines extracted therefrom with a phenol in the presence of concentrated sulphuric acid as described in the copending application Serial No. 617,604 filed June 16, 1932 jointly by H. E. Buc and the present inventor. Alkyl phenols may also be produced by similar treatment of secondary or tertiary alcohols.

This invention is applicable to the purification of normal and iso, secondary, tertiary and cyclic alkyl phenols, cresols, resorcinols and other alkyl derivatives of hydroxy aromatic compounds in which a carbon atom of an alkyl group is attached directly to a carbon atom of the aromatic nucleus. Alkyl and polyalkyl derivatives of both phenols and polyhydroxy benzenes and other aromatics containing condensed nuclei such as naphthols may also be purified according to this invention.

This invention is not to be limited to any theoretical explanations or examples which have been presented herein solely for purposes of illustration, but is limited only by the following claims in which it is desired to claim all novelty insofar as the prior art permits.

I claim:

1. Process of refining crude alkyl phenols containing an alkyl group of not less than 4 carbon atoms by removing therefrom alkyl phenyl ethers, which comprises dissolving said crude phenols in liquid ammonia, separating the ammonia solution from undissolved residue containing alkyl phenyl ethers, and then separating the dissolved phenols from the liquid ammonia.

2. Process according to claim 1 in which said alkyl phenols and alkyl phenyl ethers contain an alkyl group of not less than 4 carbon atoms.

3. Process for refining crude alkyl phenols containing an alkyl group of not less than 4 carbon atoms and prepared by reaction of an alkyl reagent selected from the class consisting of olefines and secondary and tertiary alcohols, with a phenol, which comprises admixing the crude reaction product with liquid ammonia, separating the resulting ammonia solution from undissolved residue and then separating the dissolved alkyl phenols from the liquid ammonia.

4. Process for separating alkyl phenols from alkyl phenyl ethers containing an alkyl group of not less than 4 carbon atom which comprises selectively dissolving said alkyl phenols in liquid ammonia.

REUBEN SCHULER.